(12) United States Patent
Ohashi

(10) Patent No.: US 8,250,856 B2
(45) Date of Patent: Aug. 28, 2012

(54) EXHAUST PURIFICATION DEVICE OF INTERNAL COMBUSTION ENGINE

(75) Inventor: Nobumoto Ohashi, Susono (JP)

(73) Assignee: Toyota Jidosha Kabushiki Kaisha, Aichi (JP)

( * ) Notice: Subject to any disclaimer, the term of this patent is extended or adjusted under 35 U.S.C. 154(b) by 453 days.

(21) Appl. No.: 12/517,485

(22) PCT Filed: May 1, 2008

(86) PCT No.: PCT/JP2008/058682
§ 371 (c)(1),
(2), (4) Date: Jun. 3, 2009

(87) PCT Pub. No.: WO2008/136538
PCT Pub. Date: Nov. 13, 2008

(65) Prior Publication Data
US 2010/0031640 A1    Feb. 11, 2010

(30) Foreign Application Priority Data

May 8, 2007   (JP) .................. 2007-123380

(51) Int. Cl.
*F01N 3/00*   (2006.01)

(52) U.S. Cl. ................ 60/286; 60/295; 60/301; 60/303; 60/309

(58) Field of Classification Search ............ 60/286, 60/295, 301, 303, 309
See application file for complete search history.

(56) References Cited

U.S. PATENT DOCUMENTS 5,974,794 A * 11/1999 Gotoh et al. .................. 60/286

FOREIGN PATENT DOCUMENTS

| JP | 61-207807 A | | 9/1986 |
|----|-------------|---|--------|
| JP | 2002-510005 A | | 4/2002 |
| JP | 2004-156471 | * | 6/2004 |
| JP | 2004-156471 A | | 6/2004 |
| JP | 2004-257325 A | | 9/2004 |

* cited by examiner

*Primary Examiner* — Thomas Denion
*Assistant Examiner* — Diem Tran
(74) *Attorney, Agent, or Firm* — Sughrue Mion, PLLC

(57) ABSTRACT

In an internal combustion engine, an $NO_X$ selective reducing catalyst (15) is arranged in an engine exhaust passage. Aqueous urea is fed from an aqueous urea feed valve (17) into the $NO_X$ selective reducing catalyst (15) to selectively reduce the $NO_X$ contained in the exhaust gas with the ammonia generated from the aqueous urea. The moisture contained in the exhaust gas is recovered and stored in a water tank (21). It is provided with a high concentration aqueous urea tank (22) storing high concentration aqueous urea having a higher urea concentration than the urea concentration of the aqueous urea fed to the $NO_X$ selective reducing catalyst (15), and the high concentration aqueous urea is diluted with the recovered moisture thereby generating aqueous urea fed to the $NO_X$ selective reducing catalyst (15).

2 Claims, 4 Drawing Sheets

EXHAUST PURIFICATION DEVICE OF INTERNAL COMBUSTION ENGINE

TECHNICAL FIELD

The present invention relates to an exhaust purification device of an internal combustion engine.

BACKGROUND ART

Known in the art is an internal combustion engine arranging an $NO_X$ selective reducing catalyst in an engine exhaust passage, feeding aqueous urea into the $NO_X$ selective reducing catalyst, and using the ammonia generated from the aqueous urea to selectively reduce the $NO_X$ contained in the exhaust gas, which internal combustion engine recovering moisture from the exhaust gas and mixing solid urea with the recovered moisture to thereby generate aqueous urea to be fed to the $NO_X$ selective reducing catalyst (for example, see Japanese Patent Publication (A) No. 2002-510005). If using solid urea as urea generating aqueous urea, there is the advantage that it is possible to lower the frequency at which urea is replenished.

However, there is the problem that the control of the urea concentration of the aqueous urea is difficult when using this kind of solid urea.

DISCLOSURE OF THE INVENTION

An object of the present invention is to provide an exhaust purification device of an internal combustion engine capable of easily controlling the urea concentration of aqueous urea by using high concentration aqueous urea as urea for generating aqueous urea.

According to the present invention, there is provided an exhaust purification device of an internal combustion engine arranging an $NO_X$ selective reducing catalyst in an engine exhaust passage, feeding aqueous urea into the $NO_X$ selective reducing catalyst, and using an ammonia generated from the aqueous urea to selectively reduce $NO_X$ contained in an exhaust gas, wherein moisture recovery means for recovering recoverable moisture in a vehicle and a high concentration aqueous urea tank storing high concentration aqueous urea having a higher urea concentration than a urea concentration of the aqueous urea fed to the $NO_X$ selective reducing catalyst are provided, and the high concentration aqueous urea is diluted with a recovered moisture to thereby generate aqueous urea fed to the $NO_X$ selective reducing catalyst.

BEST MODE FOR CARRYING OUT THE INVENTION

Figure 1:
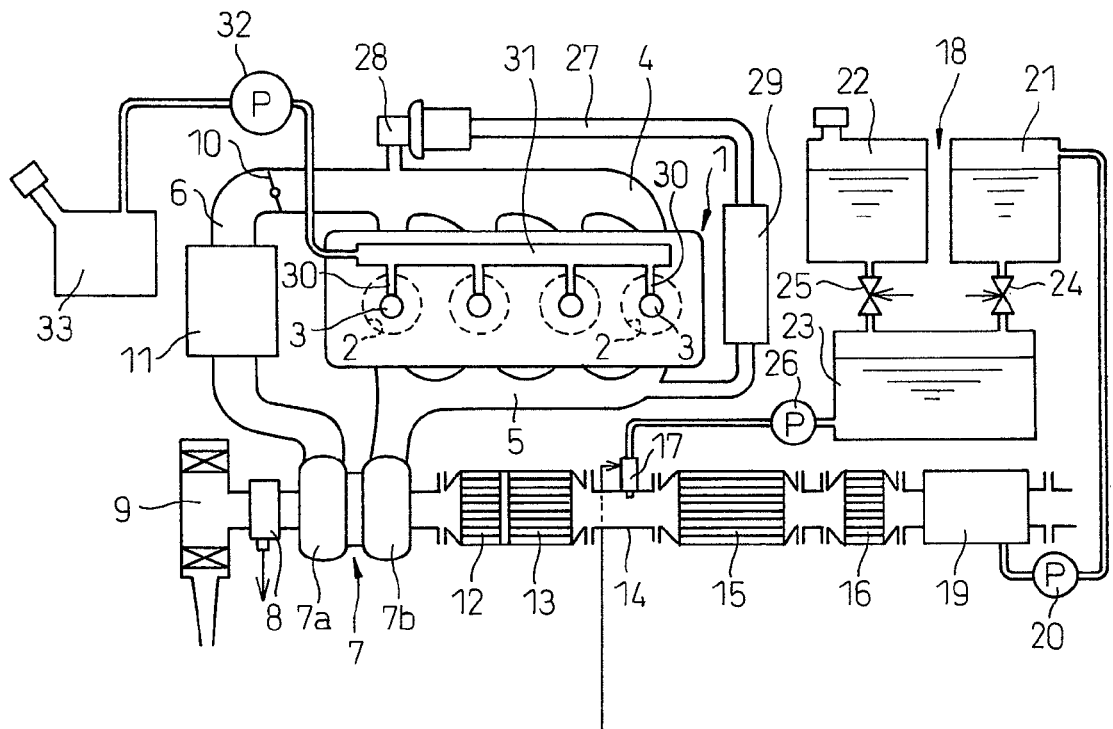
FIG. 1 is an overview of a compression ignition type internal combustion engine.
Figure 1:
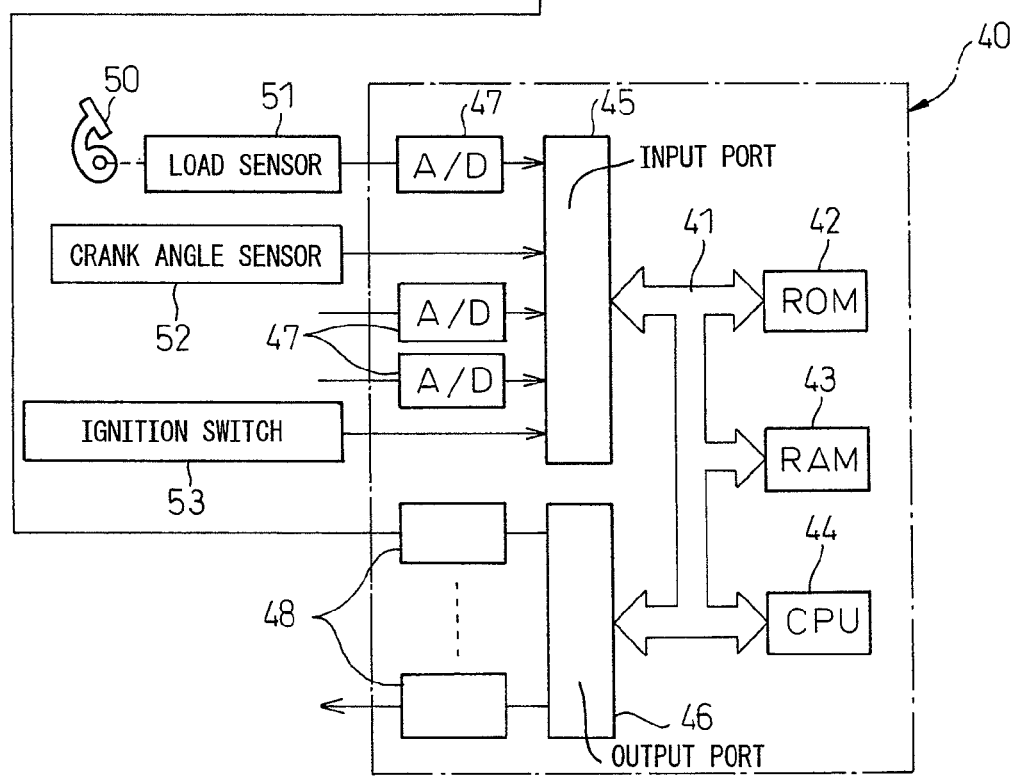

FIG. 1 is an overview of a compression ignition type internal combustion engine.

Referring to FIG. 1, 1 indicates an engine body, 2 a combustion chamber of each cylinder, 3 an electronic control type fuel injector for injecting fuel into each combustion chamber 2, 4 an intake manifold, and 5 an exhaust manifold. The intake manifold 4 is coupled through an intake duct 6 to the outlet of a compressor 7a of the exhaust turbocharger 7, while the inlet of the compressor 7a is coupled through an intake air amount detector 8 to an air cleaner 9. Inside the intake duct 6, a throttle valve 10 driven by a step motor is arranged. Further, around the intake duct 6, a cooling device 11 for cooling the intake air flowing through the inside of the intake duct 6 is arranged. In the embodiment shown in FIG. 1, the engine cooling water is guided to the cooling device 11 where the engine cooling water cools the intake air.

On the other hand, the exhaust manifold 5 is coupled with the inlet of an exhaust turbine 7b of the exhaust turbocharger 7, while the outlet of the exhaust turbine 7b is connected to the inlet of an oxidation catalyst 12. A particulate filter 13 trapping particulate matter contained in the exhaust gas is arranged adjoining the oxidation catalyst 12 downstream of this oxidation catalyst 12 and the outlet of this particulate filter 13 is coupled through an exhaust pipe 14 to the inlet of an $NO_X$ selective reducing catalyst 15. The outlet of this $NO_X$ selective reducing catalyst 15 is coupled to an oxidation catalyst 16.

The aqueous urea feed valve 17 is arranged in the exhaust pipe 14 upstream of the $NO_X$ selective reducing catalyst 15, and this aqueous urea feed valve 17 is coupled to the aqueous urea generation device 18. This aqueous urea generation device 18 is provided with a moisture recovery means for recovering recoverable moisture in a vehicle. In this embodiment shown in FIG. 1, this moisture recovery means is comprised of a moisture recovery device 19 arranged downstream of the oxidation catalyst 16 to condense the water vapor contained in the exhaust gas and recover moisture. The moisture recovered by this moisture recovery device 19 is fed by a water transfer pump 20 to a water tank 21 for storing the moisture recovered. Note that, as a moisture recovery means, a moisture recovery device that does not recover moisture from the exhaust gas but recovers condensate water generated in for example an air conditioner may be used.

Further, in the embodiment shown in FIG. 1, the aqueous urea generation device 18 is provided further with a high concentration aqueous urea tank 22 storing high concentration aqueous urea having higher urea concentration than the aqueous urea fed to the $NO_X$ selective reducing catalyst 15 and a aqueous urea generation tank 23 for generating aqueous urea fed to the $NO_X$ selective reducing catalyst 15. As shown in FIG. 1, a water flow rate control valve 24 for controlling the amount of moisture fed from the water tank 21 to the aqueous urea generation tank 23 is arranged between the water tank 21 and the aqueous urea generation tank 23, and an aqueous urea flow rate control valve 25 for controlling the amount of high concentration aqueous urea fed from the high concentration aqueous urea tank 22 to the aqueous urea generation tank 23 is arranged between the high concentration aqueous urea tank 22 and the aqueous urea generation tank 23.

In the embodiment shown in FIG. 1, by controlling the feed of moisture from the water tank 21 to the aqueous urea generation tank 23 with the water flow rate control valve 24 and controlling the feed of high concentration aqueous urea from the high concentration aqueous urea tank 22 to the aqueous urea generation tank 23 with the aqueous urea flow rate control valve 25, aqueous urea to be fed to the $NO_X$ selective reducing catalyst 15 is generated in the aqueous urea generation tank 23. That is, by diluting the high concentration aqueous urea with the recovered moisture, the aqueous urea supplied in the NOX selective reducing catalyst 15 is generated.

The aqueous urea generated in the aqueous urea generation tank 23 is injected by the feed pump 26 from the aqueous urea feed valve 17 into the exhaust gas flowing inside the exhaust pipe 14, and the $NO_X$ contained in the exhaust gas is reduced in the $NO_X$ selective reducing catalyst 15 by the ammonia $((NH_2)_2CO+H_2O \rightarrow 2NH_3+CO_2)$ generated from the urea.

The exhaust manifold 5 and the intake manifold 4 are coupled together through an exhaust gas recirculation (hereinafter referred to as "EGR") passage 27. Inside the EGR passage 27, an electronic control type EGR control valve 28 is arranged. Further, around the EGR passage 27, a cooling device 29 for cooling the EGR gas flowing through the EGR passage 27 is arranged. In the embodiment shown in FIG. 1, the engine cooling water is guided into the cooling device 29 where the engine cooling water cools the EGR gas. On the other hand, each fuel injector 3 is coupled through a fuel feed pipe 30 to a common rail 31. This common rail 31 is coupled through an electronic control type variable discharge fuel pump 32 to a fuel tank 33. The fuel stored in this fuel tank 33 is fed through the fuel pump 32 to the common rail 31. The fuel supplied to the common rail 31 is fed through each fuel feed pipe 30 to each fuel injector 3.

The electronic control unit 40 is comprised of a digital computer provided with a ROM (read only memory) 42, RAM (random access memory) 43, CPU (microprocessor) 44, input port 45, and output port 46 all connected to each other through a bi-directional bus 41. The output signal of the intake air amount detector 8 is input through the corresponding AD converter 47 to the input port 45. An accelerator pedal 50 is connected to a load sensor 51 generating an output voltage proportional to the amount of depression L of the accelerator pedal 50. The output voltage of the load sensor 51 is input through the corresponding AD converter 47 to the input port 45. Further, the input port 45 is connected to a crank angle sensor 52 generating an output pulse each time the crankshaft rotates by for example 15°. Further, on/off signals for the ignition switch 53 are input to the input port 45. On the other hand, the output port 46 is connected through the corresponding drive circuit 48 to a fuel injector 3, a step motor for driving the throttle valve 10, aqueous urea feed valve 17, water transfer pump 20, water flow rate control valve 24, aqueous urea flow rate control valve 25, feed pump 26, EGR control valve 28, and fuel pump 32.

The oxidation catalyst 12, for example, carries a precious metal catalyst such as platinum. This oxidation catalyst 12 performs the action of converting the NO contained in the exhaust gas to $NO_2$ and the action of oxidizing the HC contained in the exhaust gas. That is, $NO_2$ has stronger oxidation properties than NO, therefore if NO is converted to $NO_2$, the oxidation reaction of particulate matter trapped on the particulate filter 13 is promoted and, further, the reduction action by the ammonia at the $NO_X$ selective reducing catalyst 15 is promoted. As the particulate filter 13, a particulate filter not carrying a catalyst can be used or a particulate filter carrying a precious metal catalyst such as platinum may be used. On the other hand, the $NO_X$ selective reducing catalyst 15 may be comprised of an ammonia adsorption type Fe zeolite having a high $NO_X$ purification rate at low temperatures and may also be comprised from a titanium/vanadium based catalyst having no ammonia adsorption function. Further, the oxidation catalyst 16 carries, for example, a precious metal catalyst comprised of platinum. This oxidation catalyst 16 performs an action of oxidizing ammonia leaked from the $NO_X$ selective reducing catalyst 15.

In the embodiment shown in FIG. 1, the optimum amount of feed of aqueous urea corresponding to the operation state of the engine is calculated and aqueous urea is fed from the aqueous urea feed valve 17 based on this calculated amount of feed. Further, in this embodiment, both flow rate control valves 24, 25 are normally kept in a closed state and when the aqueous urea inside the aqueous urea generation tank 23 is low, both flow rate control valves 24, 25 open and water and high concentration aqueous urea are fed to the aqueous urea generation tank 23.

Figure 2:
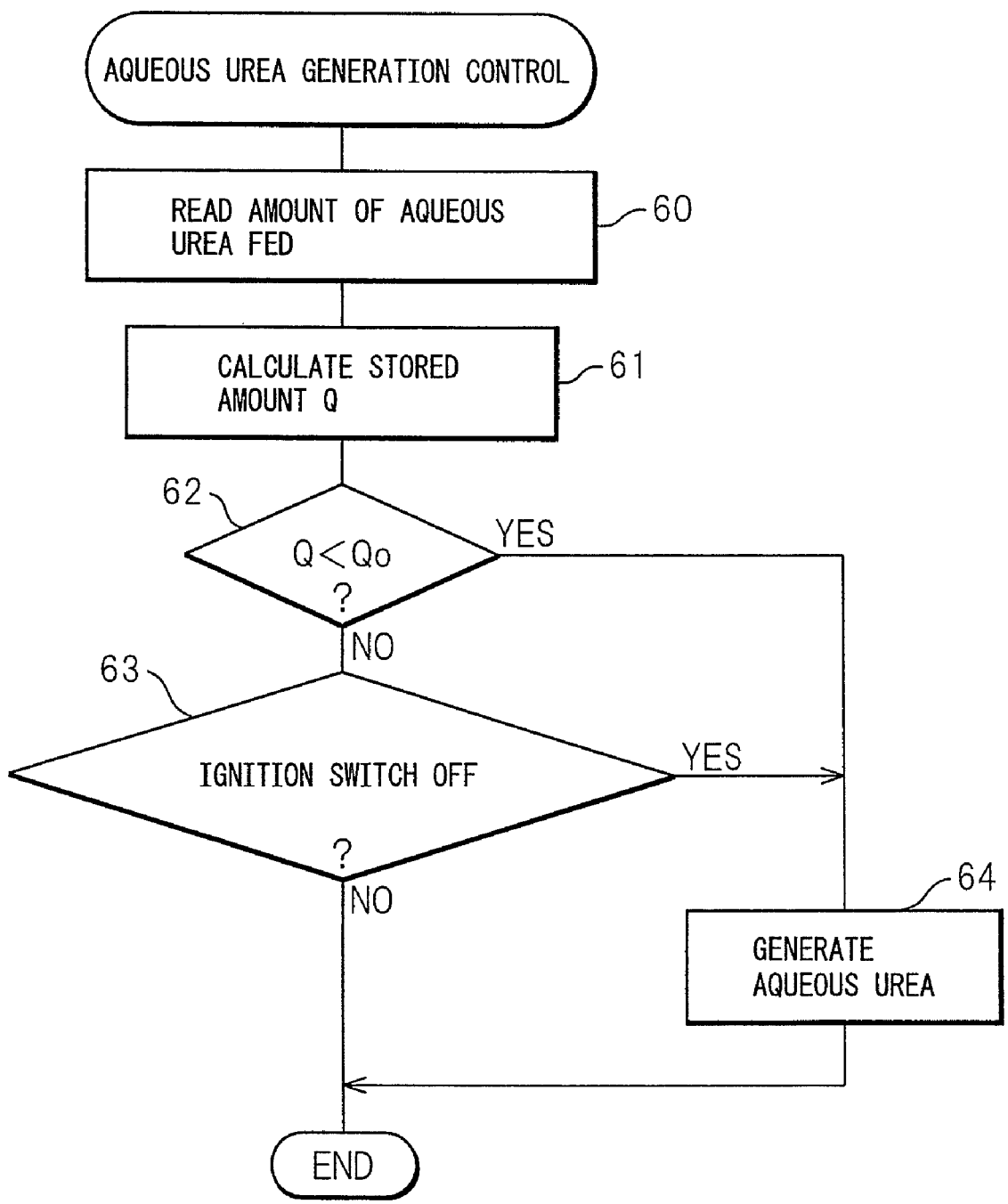
FIG. 2 is a flow chart for controlling the generation of aqueous urea.

FIG. 2 shows the routine for control of the generation of the aqueous urea like this.

Referring to FIG. 2, first, at step 60, the amount of feed of aqueous urea fed from the aqueous urea feed valve 17 is read. Next, at step 61, the stored amount Q of aqueous urea stored in the aqueous urea generation tank 23 is calculated from the amount of feed of aqueous urea. Next, at step 62, it is judged if the stored amount Q of aqueous urea is less than a predetermined allowable level $Q_0$. When $Q \geq Q_0$, the routine proceeds to step 63, where it is judged if the ignition switch 53 has been switched from on to off. When the ignition switch 53 is on, the processing cycle is completed.

On the other hand, at step 62, when the stored amount Q of the aqueous urea is less than the allowable level $Q_0$, the routine proceeds to step 64, where an action for generation of aqueous urea is performed. That is, both flow rate control valves 24, 25 open, wherein the control of the feed of moisture from the water tank 21 to the aqueous urea generation tank 23 by the water flow rate control valve 24 and the control of the feed of high concentration aqueous urea from the high concentration aqueous urea tank 22 to the aqueous urea generation tank 23 by the aqueous urea flow rate control valve 25 are performed to generate aqueous urea having a predetermined concentration.

On the other hand, at step 63, when it is judged that the ignition switch 53 has switched from on to off, the routine proceeds to step 64, where an action for generation of aqueous urea is performed. That is, here as well, both flow rate control valves 24, 25 open, wherein the control of the feed of moisture from the water tank 21 to the aqueous urea generation tank 23 by the water flow rate control valve 24 and the control of the feed of high concentration aqueous urea from the high concentration aqueous urea tank 22 to the aqueous urea generation tank 23 by the aqueous urea flow rate control valve 25 are performed to generate aqueous urea having a predetermined concentration.

That is, time is needed until the water and the high concentration aqueous urea, fed to the aqueous urea generation tank 23, mix evenly. However, a sufficiently long mixing time for the water and the high concentration aqueous urea can be obtained by feeding moisture from the water tank 21 to the aqueous urea generation tank 23 and feeding high concentration aqueous urea from the high concentration aqueous urea tank 22 to the aqueous urea generation tank 23 when the ignition switch 53 is switched from on to off. Accordingly, in this case, the aqueous urea will have a homogeneous concentration until the feed of aqueous urea from the aqueous urea feed valve 17 begins.

When the high concentration aqueous urea in the high concentration aqueous urea tank 22 becomes low, high concentration aqueous urea having a predetermined constant concentration is filled. Because the concentration of the high concentration aqueous urea in the high concentration aqueous urea tank 22 is kept constant, by controlling the ratio of the amount of moisture fed from the water tank 21 to the aqueous urea generation tank 23 to the amount of high concentration aqueous urea fed from the high concentration aqueous urea tank 22 to the aqueous urea generation tank 23 to a predetermined ratio, the concentration of the aqueous urea in the aqueous urea generation tank 23 can be easily given a predetermined constant concentration.

Figure 3:
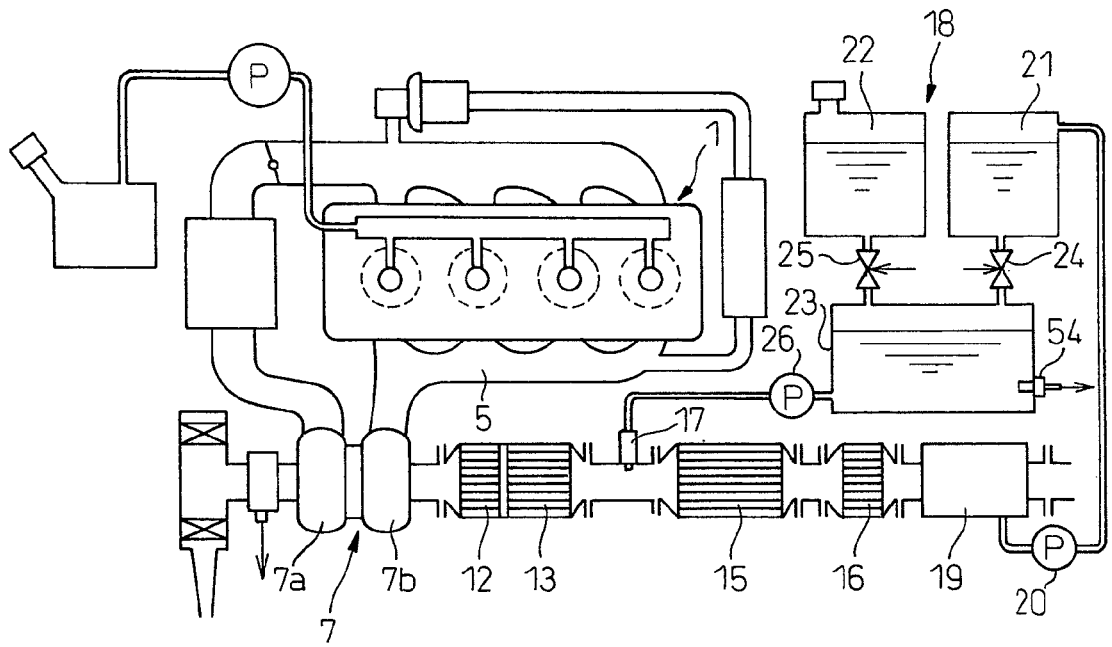
FIG. 3 is an overview showing another embodiment of a compression ignition type internal combustion engine.

FIG. 3 shows another embodiment. In this embodiment, a concentration sensor 54 for detecting the urea concentration of the aqueous urea inside the aqueous urea generation tank 23 is mounted at the aqueous urea generation tank 23. In order for the urea concentration detected by this concentration sensor 54 to become the target concentration, the amount of moisture fed from the water tank 21 to the aqueous urea generation tank 23 and the amount of high concentration aqueous urea fed from the high concentration aqueous urea tank 22 to the aqueous urea generation tank 23 are feedback controlled.

Figure 4:
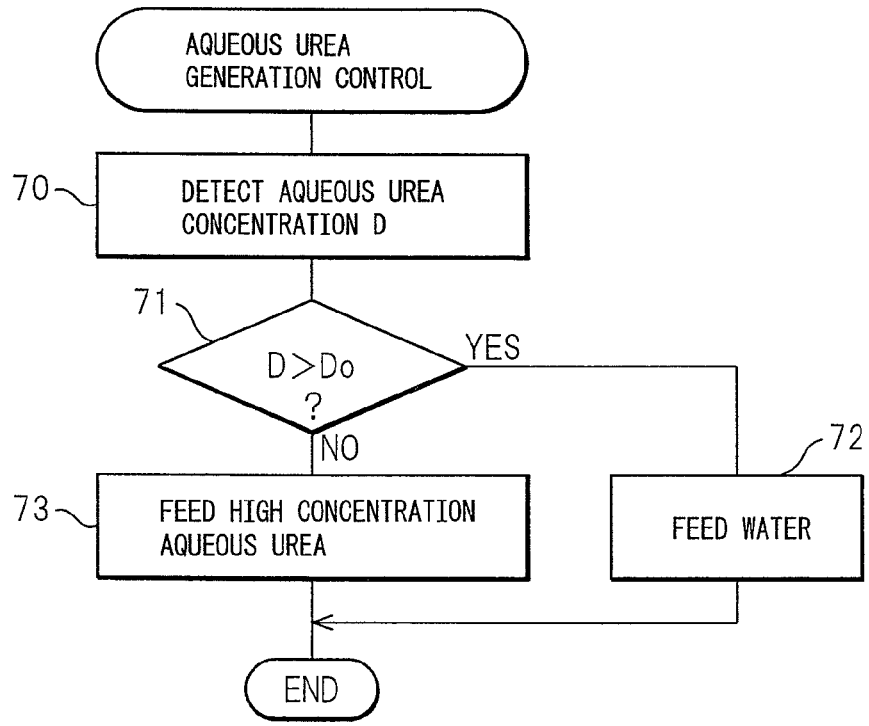
FIG. 4 is a flow chart for controlling the generation of aqueous urea.

FIG. 4 shows a routine for control of the generation of the aqueous urea like this.

Referring to FIG. 4, first, at step 70, the concentration D of the aqueous urea in the aqueous urea generation tank 23 is detected by the concentration sensor 54. Next, at step 71, it is judged if this concentration D is higher than the target concentration $D_0$. When $D>D_0$, the routine proceeds to step 72, where the water in the water tank 21 is fed to the aqueous urea generation tank 23, and when $D \leqq D_0$, the routine proceeds to step 73, where the high concentration aqueous urea in the high concentration aqueous urea tank 22 is fed to the aqueous urea generation tank 23.

Figure 5:
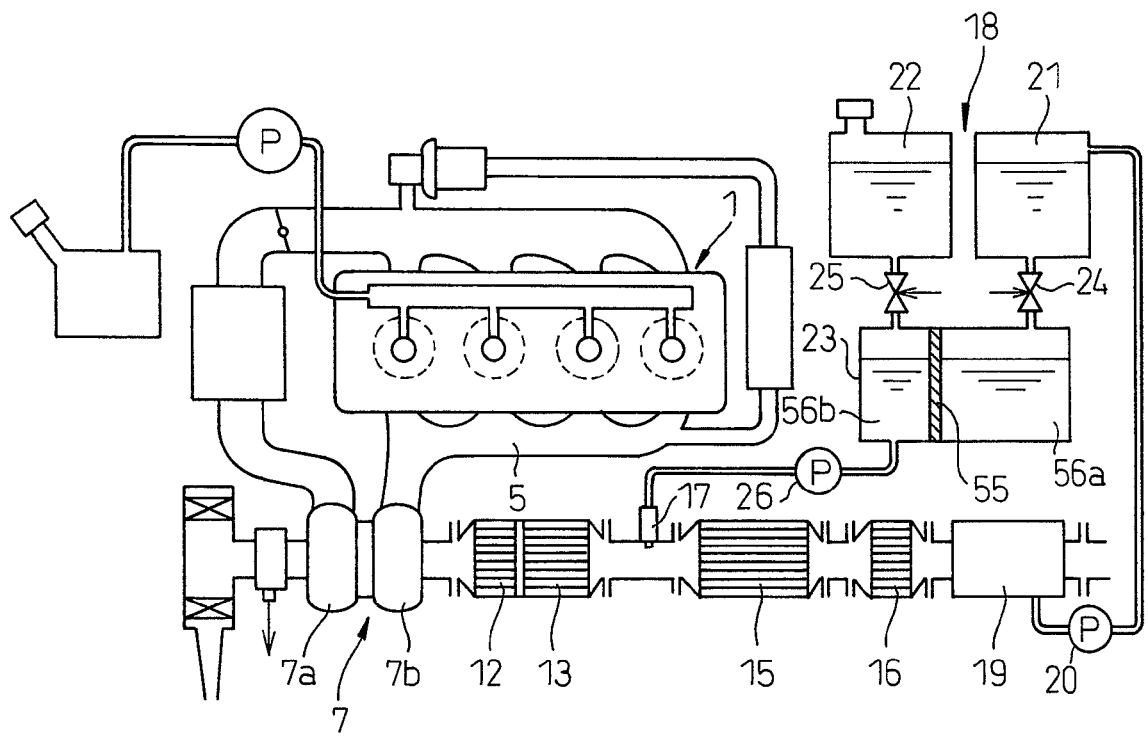
FIG. 5 is an overview showing another embodiment of a compression ignition type internal combustion engine.

FIG. 5 shows another embodiment. In this embodiment, the aqueous urea generation tank 23 is separated into two chambers 56a, 56b by a semipermeable membrane 55. The one chamber 56a of these two chambers 56a, 56b is fed moisture from the water tank 21 while the other chamber 56b is fed high concentration aqueous urea from the high concentration aqueous urea tank 22. Further, in this embodiment, the aqueous urea in the other chamber 56b is fed to the aqueous urea feed valve 17.

In this embodiment, the water in the chamber 56a permeates into the high concentration aqueous urea of the chamber 56b, and as a result, aqueous urea having a constant concentration is generated in the chamber 56b. Aqueous urea having a constant concentration is fed from the aqueous urea feed valve 17. The control for generation of the aqueous urea in this case is performed using the control routine shown in FIG. 2.

LIST OF REFERENCE NUMERALS

4 . . . intake manifold
5 . . . exhaust manifold
12, 16 . . . oxidation catalyst
13 . . . particulate filter
15 . . . $NO_X$ selective reducing catalyst
17 . . . aqueous urea feed valve
19 . . . moisture recovery device
21 . . . water tank
22 . . . high concentration aqueous urea tank
23 . . . aqueous urea generation tank

The invention claimed is:

1. An exhaust purification device of an internal combustion engine arranging an NOX selective reducing catalyst in an engine exhaust passage and feeding aqueous urea into the NOX selective reducing catalyst, using an ammonia generated from the aqueous urea to selectively reduce NOX contained in an exhaust gas, wherein moisture recovery means for recovering recoverable moisture in a vehicle, a water tank for storing the recovered moisture, an aqueous urea generation tank for generating aqueous urea fed to the NOX selective reducing catalyst and a high concentration aqueous urea tank storing high concentration aqueous urea having a higher urea concentration than a urea concentration of the aqueous urea fed to the NOX selective reducing catalyst are provided, and a feed control of moisture from the water tank to the aqueous urea generation tank and a feed control of high concentration aqueous urea from the high concentration aqueous urea tank to the aqueous urea generation tank are performed when an ignition switch is switched from on to off to allow time for generating the aqueous urea having a predetermined homogeneous concentration, the high concentration aqueous urea being diluted with a recovered moisture to thereby generate the aqueous urea to be fed to the NOX selective reducing catalyst in the aqueous urea generation tank.

2. An exhaust purification device of an internal combustion engine as claimed in claim 1, wherein a feed control of moisture from the water tank to the aqueous urea generation tank and a feed control of high concentration aqueous urea from the high concentration aqueous urea tank to the aqueous urea generation tank are performed when the aqueous urea in the aqueous urea generation tank falls below an allowable level to thereby generate the aqueous urea to be fed to the $NO_X$ selective reducing catalyst in the aqueous urea generation tank.

* * * * *